US009922083B2

(12) United States Patent
Gaza et al.

(10) Patent No.: US 9,922,083 B2
(45) Date of Patent: *Mar. 20, 2018

(54) OPTIMIZATION OF A PLURALITY OF TABLE PROCESSING OPERATIONS IN A MASSIVE PARALLEL PROCESSING ENVIRONMENT

(71) Applicant: International Business Machines Corporation, Armonk, NY (US)

(72) Inventors: Lukasz Gaza, Jankowice (PL); Artur M. Gruszecki, Kraków (PL); Tomasz Kazalski, Kraków (PL); Konrad K. Skibski, Zielonki (PL); Tomasz Stradomski, Będzin (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,456

(22) Filed: Jun. 5, 2015

(65) Prior Publication Data

US 2016/0098453 A1 Apr. 7, 2016

Related U.S. Application Data

(63) Continuation of application No. 14/505,715, filed on Oct. 3, 2014.

(51) Int. Cl.
*G06F 17/30* (2006.01)

(52) U.S. Cl.
CPC .. *G06F 17/30445* (2013.01); *G06F 17/30486* (2013.01)

(58) Field of Classification Search
None
See application file for complete search history.

(56) References Cited

U.S. PATENT DOCUMENTS 6,732,085 B1 * 5/2004 Mozes .............. G06F 17/30536
7,054,852 B1 5/2006 Cohen
(Continued)

OTHER PUBLICATIONS

Herodotou et al. Query Optimization Techniques for Partitioned Tables. ACM. Jun. 12-16, 2011.*
(Continued)

*Primary Examiner* — Hosain Alam
*Assistant Examiner* — Tuan-Khanh Phan
(74) *Attorney, Agent, or Firm* — David Zwick (57) ABSTRACT

A computer-implemented method for partitioning data for a query operation of one table of the database system is provided. The computer-implemented method comprises estimating a value distribution of the attribute in the result table based on a first value distribution of the attribute in the first column of the first table. The computer-implemented method further comprises determining boundaries for partitioning ranges of the attribute, based on the estimated value distribution, wherein the partitioning ranges correspond to a same number of rows of the result table. The computer-implemented method further comprises partitioning the first table with processing nodes of the query operation, based on the determined boundaries of partitioning ranges.

12 Claims, 7 Drawing Sheets

(56) References Cited

U.S. PATENT DOCUMENTS

| | | | |
|---|---|---|---|
| 7,970,756 | B2 | 6/2011 | Beavin et al. |
| 8,190,598 | B2 | 5/2012 | Al-Omari et al. |
| 8,234,268 | B2 | 7/2012 | Xu et al. |
| 8,510,280 | B2 | 8/2013 | Xu et al. |
| 9,317,577 | B2 | 4/2016 | Duan et al. |
| 9,569,493 | B2 | 2/2017 | Gaza et al. |
| 9,569,494 | B2 | 2/2017 | Gaza et al. |
| 9,607,042 | B2 | 3/2017 | Long |
| 2013/0152057 | A1 | 6/2013 | Ke et al. |
| 2014/0149388 | A1 | 5/2014 | Gruszecki et al. |

OTHER PUBLICATIONS

IBM: List of IBM Patents or Patent Applications Treated as Related (Appendix P).

Pending U.S. Appl. No. 14/505,715, filed Oct. 3, 2014, entitled: "Optimization of a Plurality of Table Processing Operations in a Massive Parallel Processing Environment", 42 pages.

Disclosed Anonymously, "Method for effective dropping of temporary dynamically redistributed data on MPP datawarehouse", ip.com, IP.com Number: IPCOM000228631D, Jun. 25, 2013, pp. 1-5.

Zhou et al., "Advanced Partitioning Techniques for Massively Distributed Computation", SIGMOD S12, May 20-24, 2012, ACM, 12 pages.

Rodiger et al., "Locality-Sensitive Operators for Parallel Main-Memory Database Clusters", IEEE, ICDE Conference 2014, pp. 592-603.

Pending U.S. Appl. No. 14/505,715, entitled: "Optimization of a Plurality of Table Processing Operations in a Massive Parallel Processing Environment", filed Oct. 3, 2014, 42 pages.

\* cited by examiner

| TABLE1.col1 Values | Processing Units | TABLE2.col2 Values |
|---|---|---|
| 1,1,2 | ⇒ 1 ⇐ | 1,2,2 |
| 3,4,4,4,5,6,6 | ⇒ 2 ⇐ | 6 |
| 9,9,9,9 | ⇒ 3 ⇐ | 9,9 |
| 12,13,17 | ⇒ 4 ⇐ | 13,13 |
| 43 | ⇒ 5 ⇐ | 43,43 |
| 44,44 | ⇒ 6 ⇐ | 44,45 |
| 55,78 | ⇒ 7 ⇐ | 45,55,99 |

*FIG. 7*

| TABLE1.col1 Values | Processing Units | TABLE2.col2 Values |
|---|---|---|
| 1,1,2 | ⇒ 1 ⇐ | 1,2,2 |
| 3,4,4,4,5,6,6 | ⇒ 2 ⇐ | 6 |
| 9,9,9,9 | ⇒ 3 ⇐ | 9,9 |
| 12,13,17 | ⇒ 4 ⇐ | 13,13 |
| 43 | ⇒ 5 ⇐ | 43,43 |
| 44,44 | ⇒ 6 ⇐ | 44,45 |
| 55,78 | ⇒ 7 ⇐ | 45,55,99 |

OPTIMIZATION OF A PLURALITY OF TABLE PROCESSING OPERATIONS IN A MASSIVE PARALLEL PROCESSING ENVIRONMENT

BACKGROUND

The present invention relates generally to database systems, and more particularly to optimization of a plurality of table processing operations in a massive parallel processing (MPP) environment of the database systems. A database system is an underlying software component that can be utilized by database management system (DBMS) to create, read, update, and delete data of computing systems. A database system can also be adapted to prepare an execution plan which can be optimized before execution of query of the database system. Such optimization can be performed based on several processed information of the database system. For instance, in case of a MPP environment, an important dimension of the MPP environment is distribution of data among all processing units of the database system.

SUMMARY

According to one embodiment, a computer-implemented method for partitioning data for a query operation in a database system, the query operation involving a first table having an attribute in a first column and resulting in a result table. The computer system comprises estimating a value distribution of the attribute in the result table based on a first value distribution of the attribute in the first column of the first table. The computer system further comprises determining boundaries for partitioning ranges of the attribute, based on the estimated value distribution, wherein the partitioning ranges correspond to a same number of rows of the result table. The computer system further comprises partitioning the first table with processing nodes of the query operation, based on the determined boundaries of partitioning ranges.

According to another embodiment, a computer system for partitioning data for a query operation of one table of the database system, including a first table, based on attributes of a first column of the first table, the query operation resulting in a result table for partitioning input tables of the first table. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instruction to estimate a value distribution of the attribute in the result table based on a first value distribution of the attribute in the first column of the first table. The computer system further comprises program instruction to determine boundaries for partitioning ranges of the attribute, based on the estimated value distribution, wherein the partitioning ranges correspond to a same number of rows of the result table. The computer system further comprises program instruction to determine assignment of particular partitioning ranges for processing units of the query operation, based on value distribution of the first column, stored on processing units of the query operation, based on minimization of data movement between processing units of the database system. The computer system further comprises program instructions to partition the first table with processing nodes of the query operation, based on the determined boundaries of partitioning ranges.

BRIEF DESCRIPTION OF THE SEVERAL VIEWS OF THE DRAWINGS

Novel characteristics of the invention are set forth in the appended claims. The invention will be best understood by reference to the following detailed description of the invention when read in conjunction with the accompanying Figures, wherein like reference numerals indicate like components, and:

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention comprises an approach for minimizing intermediate data skew and minimizing the amount of data exchanged between processing units, within massive parallel processing (MPP) data warehouse environments, during structured query language (SQL), single table based operations of the MPP, based on estimation of value distribution of result table of the given operation, such as, for example, a GROUP BY operation. The minimization can also be done for operations, which perform calculation on the values from two tables of the MPP environment, for instance the JOIN or UNION ALL operations. For example, the minimization may be based on estimation of value distribution of result table on the processing units, according to embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code embodied thereon. Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodies therein, for example, in baseband or as part of a carrier wave. Such a propagated signal may take any of a variety of forms, including, but not limited to, electromagnetic, optical, or any other suitable combination thereof. A computer-readable signal medium may be a computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented program language such as Java, Smalltalk, C++ or the like and conventional procedural programming languages, such as the "C" programming language or similar programming languages. The program code may execute entirely on the user's computer, partly on the user's computer, or entirely on the remote computer or server. In the latter scenario, the remote computer may be connected to the user's computer through any type of network, including local area network (LAN) or a wide area network (WAN), or the connection may be made to an external computer (for example, through the Internet using an Internet Service Provider).

Figure 1:
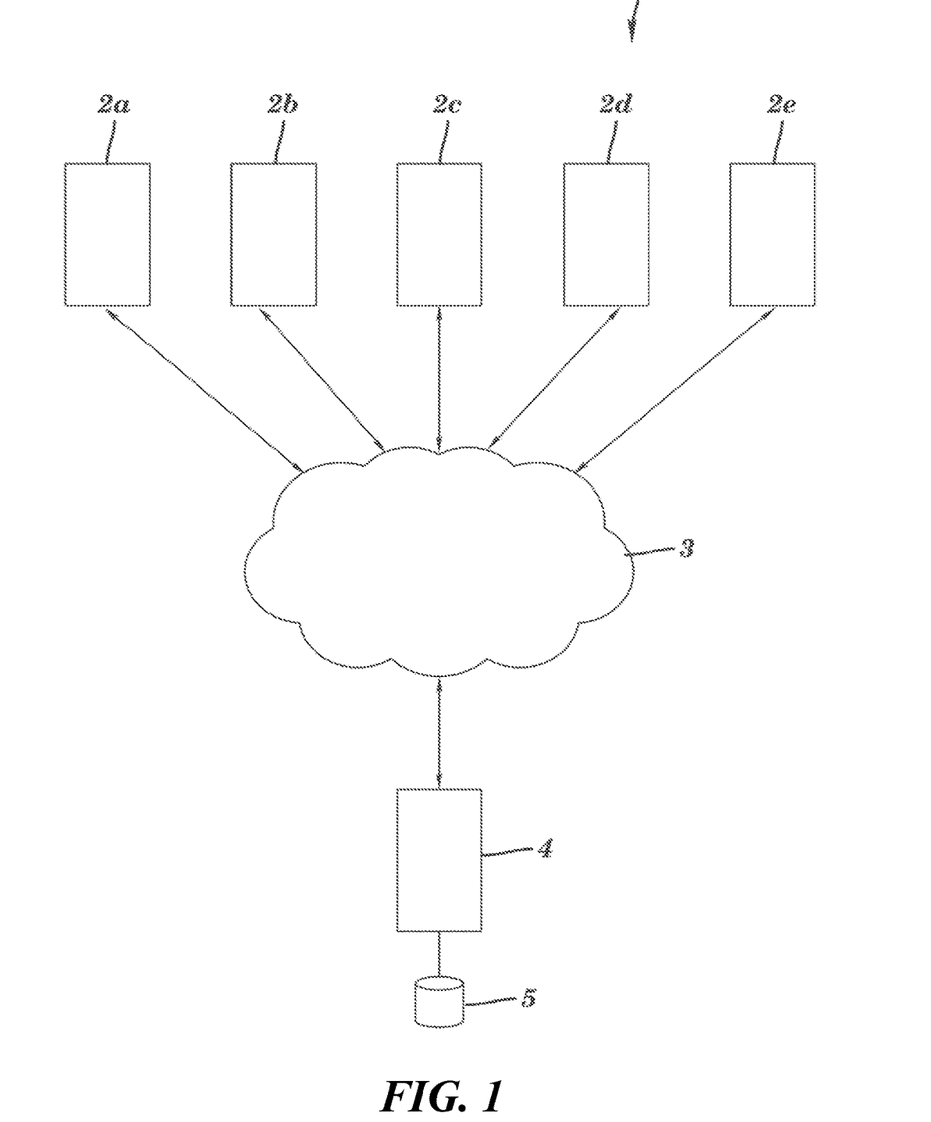
FIG. 1 is a conventional architecture of a client-server of a massive parallel processing (MPP) data warehouse environment 1 for sending requests to a database system, in accordance with embodiments of the present invention.

The present invention will now be described in accordance with the Figures. Referring to FIG. 1, a conventional architecture of a client-server of massive parallel processing (MPP) data warehouse environment 1 for sending requests to a database system 5 is illustrated. A plurality of clients 2a-2e is connected to the network 3. In addition, a server 4, which acts as a database client, is connected to the network 3 as well. The network 3, which may be composed from several sub-networks, enables the clients 2a-2e and server 4 to communicate with each other. For example, the client 2a sends a request to the server 4 over the network 3 for accessing the database system 5.

The server 4 may receive multiple requests from multiple clients and typically processes them in the order of receipt, or in other cases, according to a predefined prioritization policy. Requests queued in the server 4 wait their turn to be processed by the server 4. Once processed by the server 4, the response to the request is sent to the clients 2a-2e. A request entered into the relational database system may result in multiple operations being performed. Multiple operations of the MPP can especially be performed in several different orders without changing the result of the query, but the execution order may affect the query performance in a tremendous way. Therefore, relational database systems, including, for example, database system 5, typically comprise a component for optimizing multiple operations called query optimizer (10), i.e. to determine a proper order of the operations which leads to a minimum of execution time, as described in more details below.

Network 3 includes one or more networks of any kind that can provide communication links between various devices and computers connected together within the MPP data warehouse environment 1. Network 3 can also include connections, such as wired communication links, wireless communication links, or fiber optic cables. Network 3 can also be implemented as a number of different types of networks, including, for example, a local area network (LAN), wide area network (WAN), or a packet switched telephone network (PSTN), or some other networked system.

For example, MPP data warehouse environment 1 can utilize the Internet with network 3 representing a worldwide collection of networks. Also, the term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the World Wide Web (the Web).

One of the most important pieces of information for choosing the proper order of operations on database system 5 is to estimate the number of rows of the resulting table after the operations, hereinafter also referred to as result table. In the following, the first table comprising at least a first data column is represented by R, and the second table comprising at least a second data column is represented by S. The result table which is the result of the operations based on R and/or S is denoted by T. The number of rows of the result table is basically affected by the number of rows of the data columns R and/or S, and the spread of data within the tables, i.e. the number or frequency of distinct values within the data columns R and/or S.

The number of rows of the result table is estimated based on value distributions, for example using density distribution functions f(x) and/or g(x), wherein the first value distribution/density distribution function f(x) is representing the spread of data within the first data column R, and the second value distribution/density distribution functions g(x) is representing the spread of data within the second data column S. The density distribution functions f(x), g(x) are integrable functions on the whole domain of possible values. Assuming the density function f(x) has been already defined, obtaining the exact number of rows of the correlated table R meeting a certain criteria, e.g. $x_{min} < x < x_{max}$ can be calculated by integrating f(x):

$$\int_{Xmin}^{Xmax} f(x)dx;$$ (Formula 1)

Approximated value distributions, for example density distribution functions f(x), g(x), can be derived by using a query feedback algorithm. At the beginning it is assumed that the data are evenly spread across all values between $x_{min}$ and $x_{max}$. So, at the beginning f(x) is represented by a constant value, which can be calculated by:

$$f(x) = \frac{\text{total number of rows in the table}}{|x_{max} - x_{min}|} = const.;$$ (Formula 2)

After execution of a query based on the table R, i.e. select . . . from R where attribute <value1 (value1∈[$x_{min}$; $x_{max}$]), an information about the exact number of rows k contained within the range x<value1 can be deduced. So, the density distribution functions f(x) is evaluated by resolving the following equation (assuming the linear independence of the sub-equations):

$$\begin{cases} \int_{Xmin}^{Xmax} f(x)\,dx = \text{total number of rows in the table} \\ \int_{Xmin}^{value1} f(x)\,dx = k \end{cases};$$ (Formula 3)

Using the query feedback algorithm, each time a new query is executed, a new condition is added to the equation defining the density distribution. In a generalized way, the formula can be written as:

$$\begin{cases} \int_{x_0^0}^{x_1^0} f(x) = k_0 \\ \int_{x_0^1}^{x_1^1} f(x) = k_1 \quad ; M \in N \\ \int_{x_0^{M-1}}^{x_1^{M-1}} f(x) = k_{M-1} \end{cases}$$ (Formula 4)

In other words, for example, by usage of the query feedback algorithm, single values of the exact density distribution function f(x) are determined. The feedback of those values is used to gather, and preferably, improve the density distribution function f(x). To derive an integrable function needed for calculating the number of rows (cf. formula 1), the exact density distribution function f(x) is approximated by a polynomial with order (M−1) using M derived values. The polynomial may have the following structure:

$$f(x) = a_0 + a_1 x + a_2 x^2 + \ldots + a_{M-1} x^{M-1}$$ (Formula 5)

A person skilled in the art is able to obtain the polynomial based on the set of values M derived by using the upper mentioned query feedback algorithm. The density distribution function g(x) of the second data column S is determined in the same manner by using query feedback algorithm. As a result, the number of rows of the columns R, S containing a certain range of numerical values can be estimated by integrating the respective density distribution function f(x), g(x) within the respective range. A second aspect which may influences the number of rows of a result table T is the number of unique values $u_1$, $u_2$ within the first and second data column R, S to be processed. The number of rows of the first and second data column R, S can be estimated by using a sample of data, by determining the number of unique values $u_1$, $u_2$ within the sample of data, and by extrapolating the number of unique values within the whole column by using the information gathered for the sample, i.e. for the subset of data. Preferably, the data are sampled during the query execution, i.e. the information is gathered just in time during query execution of MPP data warehouse environment 1.

Density function is one way of representing calculation of number of rows in a particular period of database system 5. For example, assume that processing unit level statistics are available and executed by a query optimizer of database system 5. For example, in this manner, database system 5 is adaptive to estimate how many tables rows within certain periods are stored on particular processing units of database system 5. Specifically, the estimation by database system 5 allows estimation calculation of how many table's rows within certain periods are stored on particular processing units of database system 5. This can be presented in the following way, as a vector of density functions:

$$(f_1, f_2, \ldots, f_n)_A^{HashFunction}$$ (Formula 6)

Wherein, formula 6 is represented, as such: A is subset of columns of the table used as hash key for the distribution. Hash function or adaptive hash function is a data partitioning mechanism of database system 5 that allows data redistribution of database system 5 within MPP data warehouse environment 1, wherein the hash function is adaptive to evenly spread value of processing nodes of database system 5. The HashFunction (formula 6) and 'A' uniquely determined data distribution within processing units of database system 5. Further, n is a number of processing units available for computations of database system 5, and f_i is a density function for data stored on processing unit number i. Further, assume that there is a way of estimating the data spread in the result table, created as an output of considered operation (like GROUP BY, JOIN or UNION ALL). In this manner, it can be assumed exits estimated density function for a column of result table on which operation was performed. Also, for further reference, density function of result table can be identified by f_jt.

For example, determining database redistribution of database system 5 is based on the following conditions: first, determination of result table rows on every processing unit of database system 5 that are equal, and second, determination of amount of data exchanged between processing units before considered operation is minimal within database system 5, wherein determination of the first and the second conditions is represented by the hash function of database system 5. The hash function is one example of how to define boundaries for range partitioning.

$$\text{Hash Function}(x) = \begin{cases} z_1 & \text{when } x \in [x_1, x_2), \\ z_2 & \text{when } x \in [x_2, x_3), \\ \ldots \\ z_n & \text{when } x \in [x_n, x_{n+1}], \end{cases} \quad \text{(Formula 7)}$$

Wherein, formula 7 is represented as such: $\{z\_i\}$ are processing unit numbers, and domain of table's column= $[x\_1, x\_{n+1}]$, with the following two properties: First, after redistributing both input tables with it and performing operation, it will have almost equal number of rows of result table on each processing unit of database system 5, and second, data movement or utilization of data of database system 5 caused by hash function of formula 7 is minimal. In order to achieve first and second criteria or conditions of formula 7 for database redistribution, database system 5 determines split of column of domain of database system 5, and database system 5 also assigns periods of the determined split to particular processing units of database system 5.

Database system 5 determines split of the column's domain based on determination of domain split of database system 5, wherein with every partition of column's domain includes the same number of rows from result table, based on the ability for database system to calculate the density function for result table ($f\_jt$) before performing the operation itself, set of n−1 (where n is number of processing units) values $\{x\_i\}$ is obtained such as:

$$\begin{cases} \int_{x_{min}}^{x_1} f_{jt}(x)\,dx = K \\ \int_{x_1}^{x_2} f_{jt}(x)\,dx = K \\ \ldots \\ \int_{x_{n-1}}^{x_{max}} f_{jt}(x)\,dx = K \end{cases} \quad \text{(Formula 8)}$$

Wherein, formula 8 is represented by K, which is the average number of rows of result table per processing unit of database system 5:

$$K = \frac{\int_{x_{min}}^{x_{max}} f_{jt}\,dx}{n} \quad \text{(Formula 9)}$$

Wherein, $f\_jt$ is density function for result table, n—number of processing units and $x\_min < \ldots < x\_\{i-1\} < x\_i < \ldots < x\_max$.

Database system 5 assigns the periods of the determined split to particular processing units of database system 5. For example, a determination of such periods assignment includes an amount of data transmitted between processing units of database system 5. As discussed, objects of hash functions of database system 5 can be defined as a vector processing unit level density functions for first table column of database system 5 (formula 10) and also, in case of two tables based operations a vector processing units level density functions for a second table column (formula 11):

$$(f_1, f_2, \ldots, f_n)_A^{HashFunction1} \quad \text{(Formula 10)}$$

$$(g_1, g_2, \ldots, g_n)_B^{HashFunction2} \quad \text{(Formula 11)}$$

For example, formula 10 and/or formula 11 are adapted to define existing GROUP BY, JOIN or UNION ALL result tables redistributions of database system 5. Specifically, formula 10 and formula 11 reflects the number of rows of tables that are spread across processing units before GROUP BY, JOIN or UNION ALL operation performed on database system 5. For instance, amount of data from first table which is needed to be sent from processing unit i to processing unit assigned to period [x_k,x_k+1], assuming redistribution based on calculated in step 1 domain split, can be represented as follow:

$$x \int_{x_k}^{x_{k+1}} f_i \quad \text{(Formula 12)}$$

Hence, to find the periods to processing units assignment which will fulfill second condition for first table in case of one table based operations, such as, GROUP BY or UNION ALL, database system 5 determines such permutation $(p\_1, \ldots, p\_n)$ of $(1, \ldots, n)$ vector that following sum is minimal:

$$\underbrace{\sum_{k=1}^{k=n}\left(\sum_{i=1}^{i=n}\int_{x_k}^{x_{k+1}}f_i\right)}_{\substack{\text{All rows which need}\\ \text{to be moved from each}\\ \text{processing unit to the rest}\\ \text{of processing units}}} - \underbrace{\left(\int_{x_1}^{x_2}f_{p_1} + \ldots + \int_{x_n}^{x_{n+1}}f_{pn}\right)}_{\substack{\text{Reduced by all data which}\\ \text{will stay in place}}} \quad \text{(Formula 13)}$$

In formula 13, it can be noticed that permutation is equal to finding permutation for which second part of formula 13 is maximal. Similarly, for two tables based operations like JOIN operation, a second table the an equation can be maximized as follows:

$$\sum_{k=1}^{k=n}(\int_{x_k}^{x_{k+1}}(f_{pk}+g_{pk})) \quad \text{(Formula 14)}$$

The above problem can be resolved in many different ways. One approach can include counting sum for all possible permutations, wherein the processing units of database system 5 is constant; hence, the number of possible permutations is also constant from computational complexity point of view. Further, once permutation is determined, the determined hash function can be represented by the following equation:

$$\text{HashFunction}(x) = \begin{cases} p_1 & \text{when } x \in [x_1, x_2), \\ p_2 & \text{when } x \in [x_2, x_3), \\ \ldots \\ p_n & \text{when } x \in [x_n, x_{n+1}], \end{cases} \quad \text{(Formula 15)}$$

Adaptive hash function of formula 15 can ensure even data redistribution of data within database system 5 and allows to avoidance or decrease in intermediate processing skew impact on the query execution time of database system 5. For example, an adaptive hash function of formula 15 can be utilized in the following manner for JOIN operation:

consider a scenario wherein a query optimizer program of database system 5 is executed on database system 5 as follows:

select . . . from TABLE1, TABLE2 where TABLE1.col1=TABLE2.col2

In this case, the query optimizer program performs JOIN operation based on plan redistribution of the TABLE1 and TABLE2 among all processing units in such a way that rows from TABLE1 and TABLE2 with the same value in col1 and col2, respectively, are on the same processing unit of database system 5. For example, a common approach is to use a predefined hash function which will map values from col1 and col2 to the # of the processing unit. Further, in this case, a defined hash function can spread the values evenly, wherein every processing unit gets more or less the same number of distinct values. Further, during query execution, after redistributing the data among the processing unit of database system 5, JOIN is performed.

Figure 7:
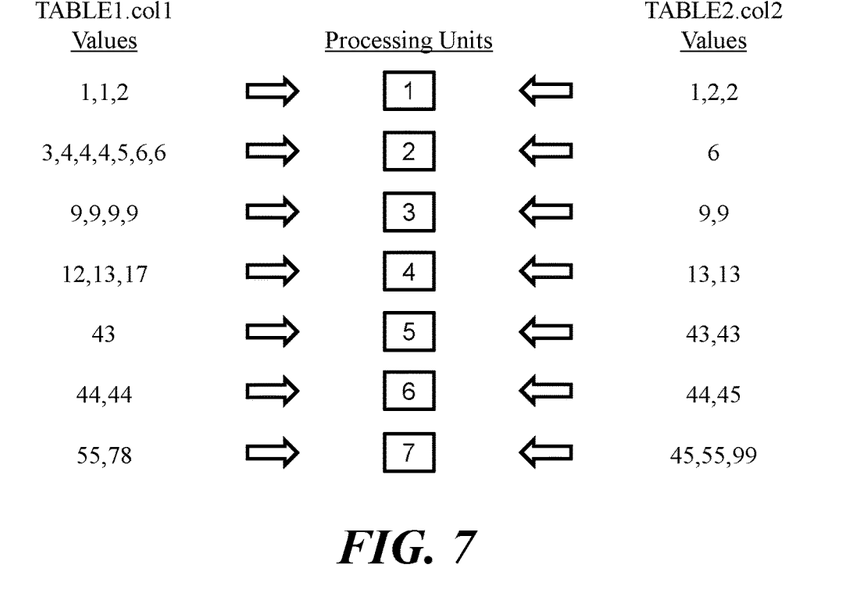
FIG. 7 illustrates an intermediate processing skew involving processing units of distinct values

For example, quite often, in this phase, database system 5 is dealing with intermediate processing skew, wherein the intermediate processing skew involves processing units of distinct values, as depicted in FIG. 7.

It can be noticed that the processing unit of FIG. 7 includes 1 or 2 distinct values, wherein, system is operating processing skew—$4^{th}$ processing unit needs to process significantly larger number of rows. In this case, an adaptive hash function of formula 15 can calculate the density function for result table (f_jt), set of n−1 (where n is number of processing units) values {x_i} is obtained such as:

$$\begin{cases} \int_{x_{min}}^{x_1} f_{jt}(x)dx = K \\ \int_{x_1}^{x_2} f_{jt}(x)dx = K \\ \ldots \\ \int_{x_{n-1}}^{x_{max}} f_{jt}(x)dx = K \end{cases}$$ (Formula 16)

Wherein, formula 16 is represented as such: K which is the average number of rows of result table per processing unit:

$$K = \frac{\int_{x_{min}}^{x_{max}} f_{jt} dx}{n}$$ (Formula 17)

wherein: f_jt is density function for result table; n—number of processing units; and x_min< . . . <x_{i−1}<x_i< . . . <x_max.

In all, as discussed in formula 15, an adaptive hash function is defined as follows:

$$f(x) = \begin{cases} 1 & \text{when } x \in [x_{min}, x_1), \\ 2 & \text{when } x \in [x_1, x_2), \\ \ldots \\ n & \text{when } x \in [x_{n-1}, x_{max}], \end{cases}$$ (Formula 18)

Figure 8:
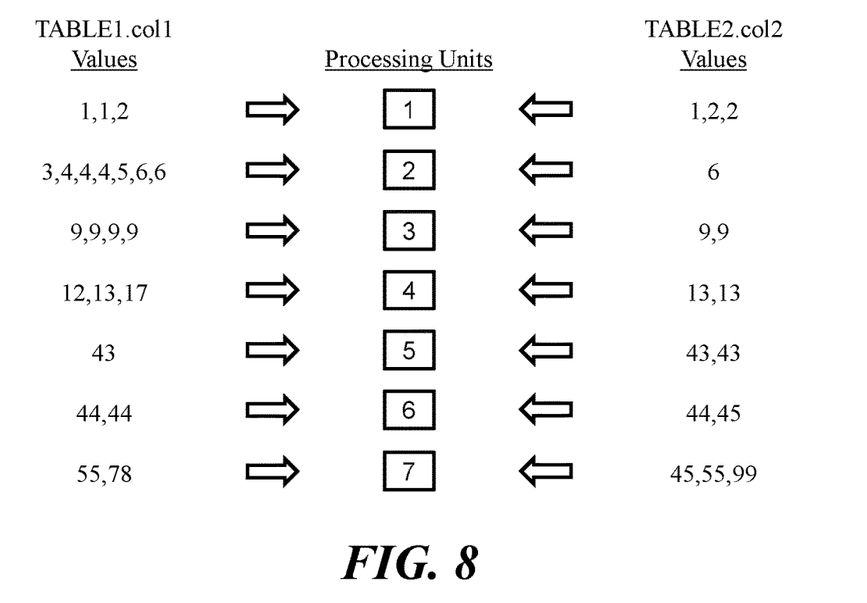
FIG. 8 illustrates a modified intermediate processing skew of FIG. 7, based on an adaptive hash function.

As previously described above, an adaptive hash function defined in such a way ensures even data redistribution of database system 5, but from result table perspective, every processing unit should get more or less the same amount of rows from the result of the operations and allows avoidance or decrease of intermediate processing skew impact on the query execution time of database system 5. As an example, consider a modified version of Table 1 and Table 2, based on an adaptive hash function of formula 15, as shown in FIG. 8.

Processing unit $4^{th}$ of Table 2, was relived or modified based on hash function of formula 15.

Further, A UNION ALL operation can be utilized to perform system operations of estimation of result table data spread, as a sum of density functions of unified tables of data redistribution of database system 5. The UNION ALL operation of database system can be defined as follows:

$$\int_a^b f_U = \int_a^b (f_A + f_B) = \int_a^b f_A + \int_a^b f_B$$ (Formula 19)

Where, f_U is density function for UNION ALL result table and f_A, and f_B are density functions of input tables.

A GROUP BY operation can also be utilized to perform the system operations of estimation of result table data spread of the data redistribution of database system 5. The GROUP BY operation can be defined as follows:

$$\int_a^b f_U = \int_a^b f_A \times \text{cardinality}_{[a,b]}$$ (Formula 20)

Where: f_U is density function for UNION ALL result table and f_A, is density function of input table for selected column.

Figure 2:
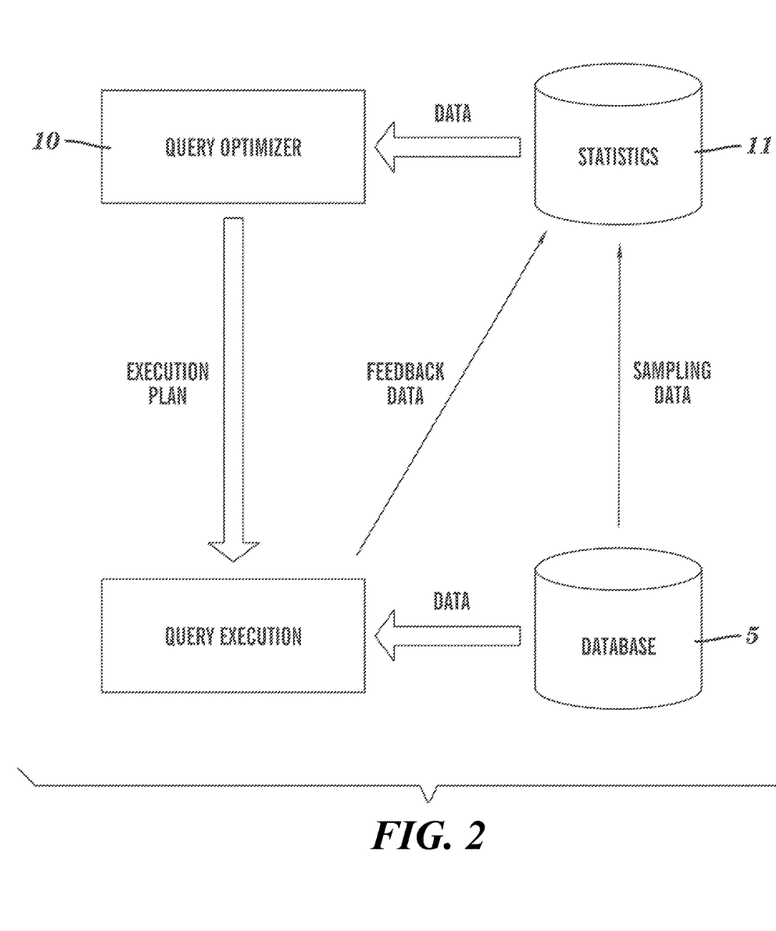
FIG. 2 depicts a schematic flow chart depicting the data flow within the database system for storing statistical information of a database system, in accordance with embodiments of the present invention.

FIG. 2 depicts a schematic flow chart depicting the data flow within the database system, in accordance with embodiments of the present invention. A statistics unit 11 is storing statistical information. The statistical information can be derived by sampling the data or by using query feedback. For example, statistical information comprise the number of unique values obtained by sampling the data or information about the exact number of rows k obtained by using query feedback algorithm.

The statistical information can be provided to the query optimizer 10, which preferably gathers an execution plan based on statistical information. The execution plan preferably defines the order of cascaded operations to optimize the query performance. The way of deriving information about the best order of cascaded operations by using statistical information is described in the following disclosure. Finally, the query is executed based on the execution plan provided by the query optimizer 10.

Figure 3:
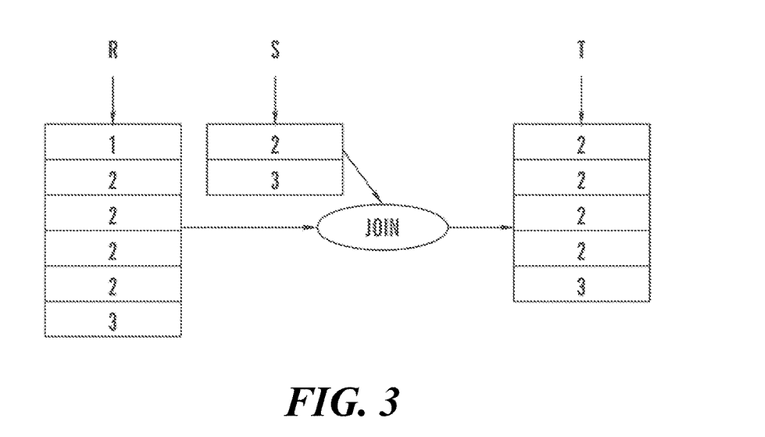
FIG. 3 depicts an example for joining first and second data column R, S by the most commonly used inner-JOIN-operation, in accordance with embodiments of the present invention.

FIG. 3 depicts an example for JOINing first and second data column R, S by the most commonly used inner-JOIN operations, in accordance with embodiments of the present invention. The resulting result table T is also shown. To estimate the number of rows of the result table by using an inner-JOIN operations, i.e. the resulting table T contains all values, which are contained in both tables to be JOINed, the following equation can be used:

$$F(a, b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) *$$

$$\max(u_1^i, u_2^i)$$ (Formula 21)

$x_0 = a$;
$x_n = b$;
$x_i \in [a,b]$;
f(x): density distribution function of the first data column R;

g(x): density distribution function of the second data column S;

a, b: starting row and end row of the respective columns which are incorporated into the JOIN.

$u_1^i$: number of unique values of the first data column R in the respective interval i;

$u_2^i$: number of unique values of the second data column S in the respective interval i;

F(a,b): estimated number of rows of the resulting table T by JOINing first and second data column R, S in the interval [a,b].

The first term $$\frac{\max\left(\int_{x_i}^{x_{i+1}} f(x)dx, 0\right)}{u_1^i}$$

within formula 21 represents the average number of rows per unique value in the $[x_i; x_{i+1}]$-section for the first data column R, the second term $$\frac{\max\left(\int_{x_i}^{x_{i+1}} g(x)dx, 0\right)}{u_2^i}$$

within formula 21 represents the average number of rows per unique value in the $[x_i; x_{i+1}]$-section for the second data column S. The third term $\max(u_1^i, u_2^i)$ is for deriving the maximum value of the numbers of unique values contained in the $[x_i; x_{i+1}]$-sequences of the first and second data column.

Formula 21 can be simplified in the following way:

$$F(a,b) = \sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 0\right)}{u_2^i} \right) * \max(u_1^i, u_2^i) \quad \text{(Formula 22)}$$

$$\sum_{i=0}^{n-1} \left( \max\left(\int_{x_i}^{x_{i+1}} f(x)dx, 0\right) * \max\left(\int_{x_i}^{x_{i+1}} g(x)dx, 0\right) \right) * \frac{\max(u_1^i, u_2^i)}{u_1^i * u_2^i} =$$

$$\sum_{i=0}^{n-1} \frac{\max\left(\int_{x_i}^{x_{i+1}} f(x)dx, 0\right) * \max\left(\int_{x_i}^{x_{i+1}} g(x)dx, 0\right)}{\min(u_1^i, u_2^i)};$$

According to formulas 21 and 22, the interval between the starting row a and the end row b is sub-divided in n sections or segments, wherein n is a natural number N. Preferably the sections are chosen according to the roots of the first and second density distribution function f(x), g(x), i.e. the set of $x_i$ contains at least all roots of the first and second density distribution function f(x), g(x). To adjust the accuracy of the result of the estimation of number of rows of the result table T, i.e. to adjust the accuracy of the JOIN estimation to the required level, the number of sections n can be adapted. For achieving a high accuracy, the number of sections n is increased. In contrary, in cases where a JOIN estimation with a lower accuracy is acceptable, the number of sections n can be decreased.

The number of sections n can also be determined in a more sophisticated way. The differential of the density distribution function can be used to determine the stiffness of the density distribution function. Preferably the following equation could be used to determine the beginning of the next section:

$$x_i = x_{i-1} + \frac{c}{|f'(x_{i-1})|} \quad \text{(Formula 23)}$$

wherein $x_i$=starting value of next section;
$x_{i-1}$=starting value of actual section;
c=constant over the hole domain [a, b];
f'(x)=differential of the density distribution function f(x).

The main advantage of using the stiffness of the density distribution function to determine the section grid is that regions with a high stiffness of density function are correlated with smaller sections and regions with a lower stiffness are represented by major sections.

Figure 4:
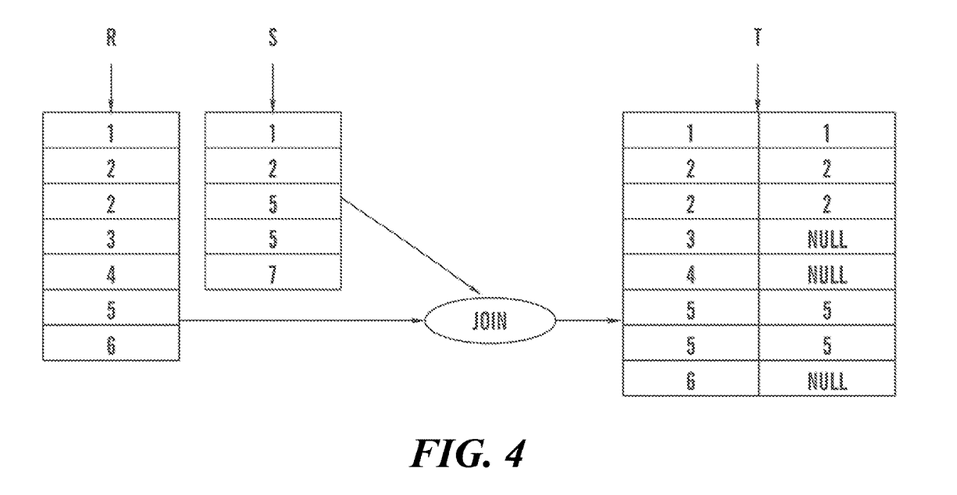
FIG. 4 illustrates an example for JOINing first and second data column R, S by left-outer-JOIN-operation is shown, in accordance with embodiments of the present invention.

FIG. 4 illustrates an example for JOINing first and second data column R, S by left-outer-JOIN operations as shown, in accordance with embodiments of the present invention. For example, in left-outer-JOIN operations we have to consider intervals in which second data column S does not have rows. In other words, if there is a row with value A in first data column R, and there is no such row in second data column S, resulting table T will contain this row with "nulls" in the columns taken from second data column S. To estimate the number of rows of the result table T by using a left-outer-JOIN operations, the following equation can be used:

$$F(a,b) = \quad \text{(Formula 24)}$$

$$\sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 1\right)}{u_2^i} \right) *$$

$$\max(u_1^i, u_2^i)$$

The difference between formula 24 (left-outer-JOIN operation case) and formula 21 (inner-JOIN operation case) is the value "1" instead of value "0" in the second maximum function. The reason for that are the cases where there are no rows in the second table in the respective sequence $[x_i; x_{i+1}]$. In those cases all rows from first data column R with null on the right side should be included into resulting table T (cf. FIG. 4).

Formula 24 can be simplified in the following way:

$$F(a,b) = \quad \text{(Formula 25)}$$

$$\sum_{i=0}^{n-1} \left( \frac{\max\left(\int_{x_i}^{x_{i+1}} f(x)dx, 0\right)}{u_1^i} * \frac{\max\left(\int_{x_i}^{x_{i+1}} g(x)dx, 1\right)}{u_2^i} \right) *$$

$$\max(u_1^i, u_2^i) =$$

$$\sum_{i=0}^{n-1} \left( \max\left(\int_{x_i}^{x_{i+1}} f(x)dx, 0\right) * \max\left(\int_{x_i}^{x_{i+1}} g(x)dx, 1\right) \right) *$$

-continued $$\frac{\max(u_1^i, u_2^i)}{u_1^i * u_2^i} =$$

$$\sum\nolimits_{i=0}^{n-1} \frac{\max\left(\int_{x_i}^{x_{i+1}} f(x)dx, 0\right) * \max\left(\int_{x_i}^{x_{i+1}} g(x)dx, 1\right)}{\min(u_1^i, u_2^i)}$$

$$\approx \sum\nolimits_{i=0}^{n-1} \max\left(\int_{x_i}^{x_{i+1}} f(x)dx, 0\right) *$$

$$\max\left(\frac{\int_{x_i}^{x_{i+1}} g(x)dx}{\min(u_1^i, u_2^i)}, 1\right)$$

The case of right-outer-JOIN operations is similar to the left-outer-JOIN operation in the way that we have to consider intervals in which first data column R does not have rows. In other words, if there is a row with value A in second data column S, and there is no such row in first data column R, resulting table T will contain this row with "nulls" in the columns taken from the first data column R. To estimate the number of rows of the result table T by using an right-outer-JOIN operation, the following equation can be used:

$$F(a, b) = \qquad \text{(Formula 26)}$$

$$\sum\nolimits_{i=0}^{n-1} \left( \frac{\max\left(\int_{x_i}^{x_{i+1}} f(x)dx, 1\right)}{u_1^i} * \frac{\max\left(\int_{x_i}^{x_{i+1}} g(x)dx, 0\right)}{u_2^i} \right) *$$

$$\max(u_1^i, u_2^i) =$$

$$\sum\nolimits_{i=0}^{n-1} \left( \max\left(\int_{x_i}^{x_{i+1}} f(x)dx, 1\right) * \max\left(\int_{x_i}^{x_{i+1}} g(x)dx, 0\right) \right) *$$

$$\frac{\max(u_1^i, u_2^i)}{u_1^i * u_2^i} =$$

$$\sum\nolimits_{i=0}^{n-1} \frac{\max\left(\int_{x_i}^{x_{i+1}} f(x)dx, 1\right) * \max\left(\int_{x_i}^{x_{i+1}} g(x)dx, 0\right)}{\min(u_1^i, u_2^i)}$$

$$\approx \sum\nolimits_{i=0}^{n-1} \max\left(\frac{\int_{x_i}^{x_{i+1}} f(x)dx}{\min(u_1^i, u_2^i)}, 1\right) *$$

$$\max\left(\int_{x_i}^{x_{i+1}} g(x)dx, 0\right)$$

Comparing formula 26 with formula 25, formula 26 is the reversed image of formula 25.

Also, by using the cross-JOIN operations, all rows of the first data column R will be JOINed with all rows of the second data column S. Cross-JOIN operations returns the Cartesian product of rows from columns in the JOIN. In other words, it will produce rows which combine each row from the first data column R with each row from the second data column S. Therefore, the number of rows of the cross-JOINed table T can be estimated using the following equation:

$$F(a,b) = \sum\nolimits_{i=0}^{n-1} \max(\int_{x_i}^{x_{i+1}} f(x)dx, 0) * \max(\int_{y_i}^{y_{i+1}} g(x)dx, 0) \quad \text{(Formula 27)}$$

wherein
$x_0 = y_0 = a$;
$x_n = y_m = b$;
$x_i, y_i \in [a,b]$;

It is worth noting that in formulas 21, 22, 24, 25, and 26, the number of unique value $u_1, u_2 \neq 0$.

In a second embodiment of the invention, the number of rows of the JOINed table T is also determined based on statistical information derived out of samples of the first and second data columns R, S, but the samples are used for calculating the exact number of rows of a sample-JOINed table, which is the result of JOINing both samples and extrapolating the derived result to the whole section or domain. To estimate the number of rows of the JOINed table T, the following equation can be used:

$$F(a, b) = \qquad \text{(Formula 28)}$$

$$\sum\nolimits_{i=0}^{n-1} F(S_1^i, S_2^i) * \left( \frac{\int_{x_i}^{x_{i+1}} f(x)dx}{|s_1^i|} * \frac{\int_{x_i}^{x_{i+1}} g(x)dx}{|s_2^i|} \right)$$

wherein
$x_0 = a$;
$x_n = b$;
$x_i \in [a,b]$;
f(x): density distribution function of the first data column R;
g(x): density distribution function of the second data column S;
a, b: starting row and end row of the respective columns which are incorporated into the JOIN;
$S_1^i$: samples randomly chosen from section $[x_i; x_{i+1}]$ from the first data columns R;
$S_2^i$: samples randomly chosen from section $[x_i; x_{i+1}]$ from the second data columns S;
$F(S_1^i, S_2^i)$: exact number of rows by applying a JOIN operation on the samples $S_1^i$ $S_2^i$;
$|S_1^i|, |S_2^i|$: number of values within the samples;
F(a,b): estimated number of rows of the resulting table by JOINing first and second data column R, S in the interval [a,b].

The first term $F(S_1^i, S_2^i)$ within formula 28 represents the exact calculation of number of rows of the result table based on samples of data, the second term $$\frac{\int_{x_i}^{x_{i+1}} f(x)dx}{|s_1^i|}$$

represents a factor expressing how many times the set of data contained in the section $[x_i; x_{i+1}]$ of the first data column R is bigger than the sample of data of the first data column R, and the third term $$\frac{\int_{x_i}^{x_{i+1}} g(x)dx}{|s_2^i|}$$

represents a factor expressing how many times the set of data contained in the section $[x_i; x_{i+1}]$ of the second data column S is bigger than the sample of data of the second data column S. The main advantage of the second embodiment is that it can be used for all kinds of JOIN operations. It is only required to calculate the JOIN of the sample data based on the respective JOIN operations to be estimated.

Figure 5:
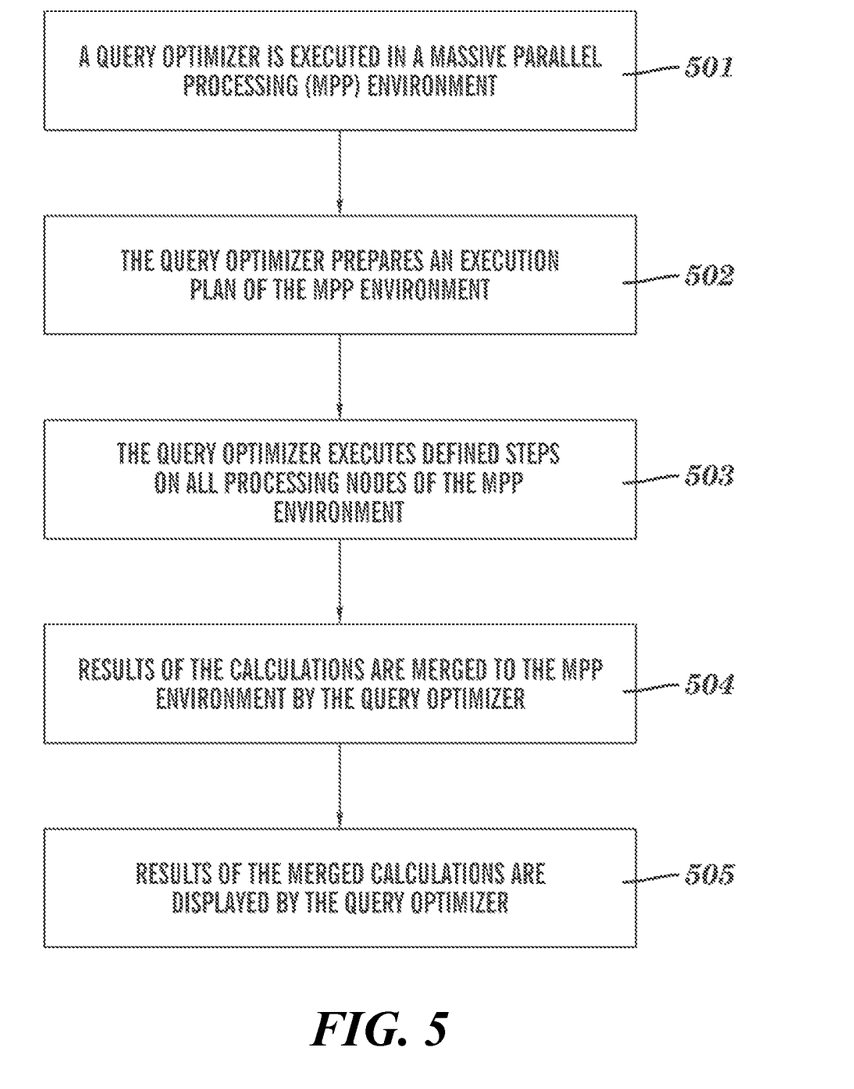
FIG. 5 is a flow diagram depicting steps performed by a query optimizer for executing processing nodes within a MPP data warehouse environment, in accordance with embodiments of the present invention.

FIG. 5 is a flow diagram depicting steps performed by query optimizer 10 for executing processing nodes within MPP data warehouse environment 1, in accordance with embodiments of the present invention. Query optimizer 10 is executed within MPP data warehouse environment 1 (Step 501). Query optimizer 10 can be executed directly within MPP data warehouse environment 1 based on program command lines of MPP data warehouse environment 1, or query optimizer 10 can be executed remotely by one or more system applications or drivers of MPP data warehouse environment 1.

Query optimizer 10 prepares an execution plan for executing processing nodes within MPP data warehouse environment 1 (Step 502). For example, query optimizer 10 can prepare the execution plan based on a defined set of rules, or statistics of stored data of MPP data warehouse environment 1. Query optimizer 10 executes defined steps on all processing nodes of MPP data warehouse environment 1 (Step 503). Partial results of the calculations from all processing units of MPP data warehouse environment 1 are transmitted and merged into final results (Step 504). Final results of the calculations are transmitted as a query result to MPP computing environment for executing processing nodes within MPP data warehouse environment 1 (Step 505).

Figure 6:
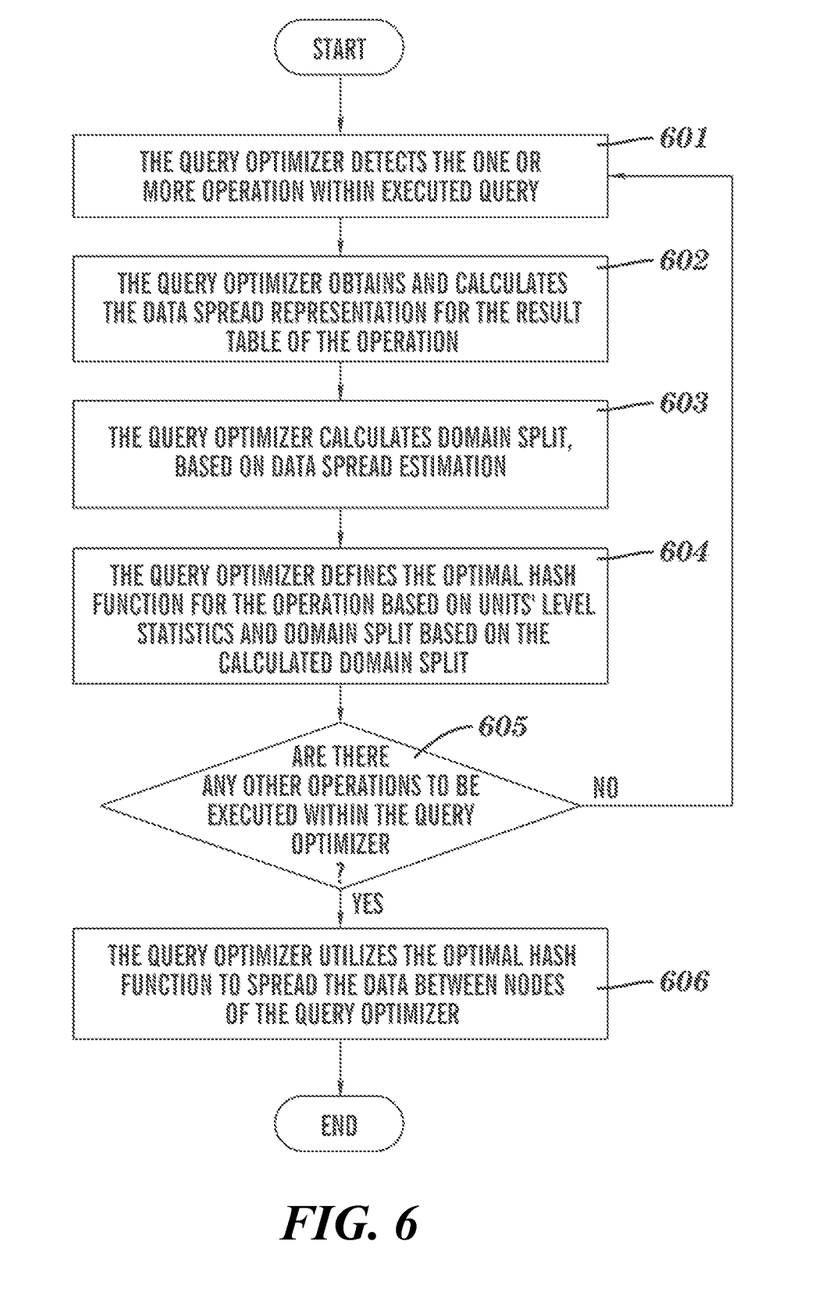
FIG. 6 is a flow diagram depicting steps performed by a query optimizer for calculating data spread representation for a result table of processing nodes within MPP data warehouse environment 1, in accordance with embodiments of the present invention.

FIG. 6 is a flow diagram depicting steps performed by query optimizer 10 for calculating data spread representation for a result table of processing nodes within MPP data warehouse environment 1, in accordance with embodiments of the present invention. Query optimizer 10 detects one or more program operations of MPP data warehouse environment 1, of the executed query optimizer. (Step 601). Query optimizer 10 obtains and calculates data spread representation for the result table of the program operations of PP data warehouse environment 1. (Step 602).

Query optimizer 10 calculates domain split of the data spread, based on data spread estimation of MPP data warehouse environment 1. (Step 603). Query optimizer 10 defines optimal has function for performing the program operations, based on unit level statistics and domain split, based on the calculated domain split. (Step 604). At decision 605, query optimizer 10 determines whether there are any further operations to be executed within query optimizer 10. If further operation need to be executed within query optimizer, then, at step 606, query optimizer 10 utilizes the optimal has function to spread the data between operating nodes of query optimizer 10. However, if query optimizer 10 determines that there are no further operations that need to be executed within query optimizer 10, then at step 601, query optimizer 10 detects one or more operations within executed query of MPP data warehouse environment 1.

Figure 9:
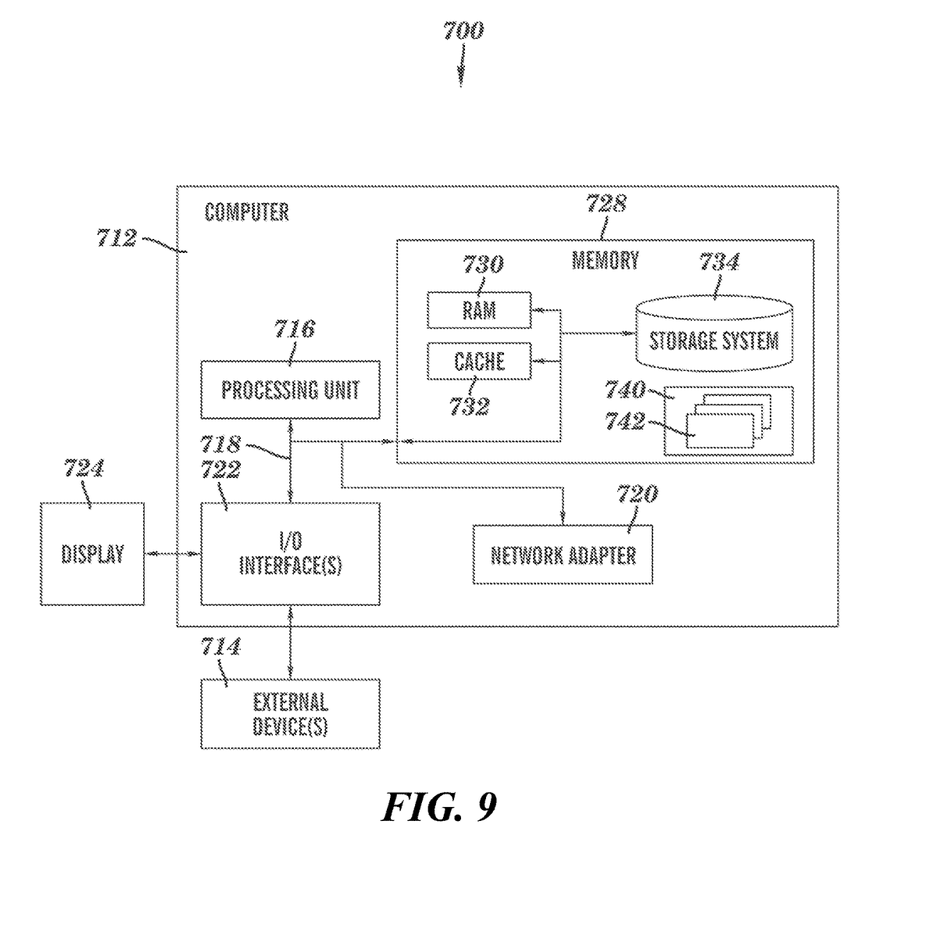
FIG. 9 illustrates a block diagram of components of a computer system in accordance with embodiments of the present invention.

FIG. 9 is a functional block diagram of a computer system, in accordance with an embodiment of the present invention.

Computer system 700 is only one example of a suitable computer system and is not intended to suggest any limitation as to the scope of use or functionality of embodiments of the invention described herein. Computer system 700 is capable of being implemented and/or performing any of the functionality set forth hereinabove.

In computer system 700 there is computer 712, which is operational with numerous other general purpose or special purpose computing system environments or configurations. Examples of well-known computing systems, environments, and/or configurations that may be suitable for use with computer 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Query optimizer 10 can include or can be implemented as an instance of computer 712. Computer 712 may be described in the general context of computer system executable instructions, such as program modules, being executed by a computer system. Generally, program modules may include routines, programs, objects, components, logic, data structures, and so on that perform particular tasks or implement particular abstract data types. Computer 712 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 9, computer 712 is shown in the form of a general-purpose computing device. The components of computer 712 may include, but are not limited to, one or more processors or processing units 716, memory 728, I/O interface 722, and bus 718 that couples various system components including memory 728 to processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 712 typically includes a variety of computer system readable media. Such media may be any available media that is accessible by computer 712, and includes both volatile and non-volatile media, and removable and non-removable media.

Memory 728 includes computer system readable media in the form of volatile memory, such as random access memory (RAM) 730 and/or cache 732. Computer 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Query optimizer 10 can be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. For example, query optimizer 10 is implemented as an instance of program 740.

Computer 712 may also communicate with one or more external devices 714 such as a keyboard, a pointing device, etc., as well as display 724; one or more devices that enable a user to interact with computer 712; and/or any devices (e.g., network card, modem, etc.) that enable computer 712 to communicate with one or more other computing devices. Such communication occurs via Input/Output (I/O) interfaces 722. Still yet, computer 712 communicates with one or more networks such as a local area network (LAN), a general wide area network (WAN), and/or a public network (e.g., the Internet) via network adapter 720.

As depicted, network adapter 720 communicates with the other components of computer 712 via bus 718. It should be understood that although not shown, other hardware and/or software components could be used in conjunction with computer 712. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as verilog, or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for partitioning data for a query operation of one table of the database system, including a first table, based on attributes of a first column of the first table, the query operation resulting in a result table for partitioning input tables of the first table has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer system for partitioning data for a query operation of one table of the database system, including a first table, based on attributes of a first column of the first table, the query operation resulting in a result table for partitioning input tables of the first table, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instruction to estimate a value distribution of an attribute in the result table based on a first value distribution of the attribute in the first column of the first table, wherein the step of estimating the value distribution of the attribute in the result table is based on the first value distribution of the attribute in the first column and on a second value distribution of the attribute in the second column, and wherein the first value distribution represents spread of data within the first column and the second value represents the second column;
program instruction to determine boundaries for partitioning ranges of the attribute, based on the estimated value distribution, wherein the partitioning ranges correspond to a same number of rows of the result table, wherein the rows of the result table are estimated based on value distributions of a density distribution function, wherein a first value distribution and the density distribution are representing a spread of data within a first data column and a second value distribution density function and, wherein the second value distribution function represents a spread of data within a second data column;
program instruction to determine assignment of particular partitioning ranges for processing units of the query operation, based on value distribution of the first column, stored on processing units of the query operation, based on minimization of data movement between processing units of the database system; and
program instructions to partition the first table with processing nodes of the query operation, based on the determined boundaries of partitioning ranges.

2. The computer system of claim 1 further comprises:
program instructions to determine assignment of particular partitioning ranges of the attribute for processing units of the query operation based on minimization of data movement between processing units of the database system in view of assignment of the first column for the processing units of the query operation before the query operation;
wherein the step of partitioning the first table is based on the determined boundaries of partitioning ranges and the assignment of particular partitioning ranges for processing units of the query operation.

3. The computer system of claim 2, wherein the query operation further involves a second table having the attribute in a second column, wherein the step of determining assignment of particular partitioning ranges of the attribute is done in view of assignment of the first column and the second column for the processing units before the query operation, the method further comprises: program instructions to partition the second table based on the determined boundaries of partitioning ranges and the assignment of particular partitioning ranges for processing units of the query processing.

4. The computer system of claim 1, wherein the query operation further involves a second table having the attribute in a second column, wherein the step of estimating the value distribution of the attribute in the result table is based on the first value distribution of the attribute in the first column and on a second value distribution of the attribute in the second column, the method further comprises: program instructions to partition the second table based on the determined boundaries of partitioning ranges.

5. The computer system of claim 4, wherein estimation of value distribution data is based on at least one of the following: a sum of density functions of the query operation; a count of number of rows with particular value of the first table and the second table; a sum of density functions of group tables of the query operation.

6. The computer system of claim 5 further comprises: program instructions to assign the determined partitioning ranges of the attribute to the processing units of the query operation based on defined hash functions of data distribution.

7. The computer system of claim 1 further comprises: program instructions to assign the determined partitioning ranges of the attribute to the processing units of the query operation based on defined hash functions of data distribution.

8. The computer system of claim 1, wherein the value distribution of the result table is same as that of the first table.

9. A computer program product for partitioning data for a query operation of one table of the database system, including a first table, based on attributes of a first column of the first table, the query operation resulting in a result table for partitioning input tables of the first table, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instruction to estimate a value distribution of an attribute in the result table based on a first value distribution of the attribute in the first column of the first table, wherein the step of estimating the value distribution of the attribute in the result table is based on the first value distribution of the attribute in the first column and on a second value distribution of the attribute in the second column, and wherein the first value distribution represents spread of data within the first column and the second value represents the second column;
program instruction to determine boundaries for partitioning ranges of the attribute, based on the estimated value distribution, wherein the partitioning ranges correspond to a same number of rows of the result table, wherein the rows of the result table are estimated based on value distributions of a density distribution function, wherein a first value distribution and the density distribution are representing a spread of data within a first data column and a second value distribution density function and, wherein the second value distribution function represents a spread of data within a second data column;

program instruction to determine assignment of particular partitioning ranges for processing units of the query operation, based on value distribution of the first column, stored on processing units of the query operation, based on minimization of data movement between processing units of the database system; and program instructions to partition the first table with processing nodes of the query operation, based on the determined boundaries of partitioning ranges.

10. The computer program product of claim 9 further comprises:

program instructions to determine assignment of particular partitioning ranges of the attribute for processing units of the query operation based on minimization of data movement between processing units of the database system in view of assignment of the first column for the processing units of the query operation before the query operation;

wherein the step of partitioning the first table is based on the determined boundaries of partitioning ranges and the assignment of particular partitioning ranges for processing units of the query operation.

11. The computer program product of claim 10, wherein the query operation further involves a second table having the attribute in a second column, wherein the step of determining assignment of particular partitioning ranges of the attribute is done in view of assignment of the first column and the second column for the processing units before the query operation, the method further comprising: program instructions to partition the second table based on the determined boundaries of partitioning ranges and the assignment of particular partitioning ranges for processing units of the query processing.

12. The computer program product of claim 11, wherein the query operation further involves a second table having the attribute in a second column, wherein the step of estimating the value distribution of the attribute in the result table is based on the first value distribution of the attribute in the first column and on a second value distribution of the attribute in the second column, the method further comprises: program instructions to partition the second table based on the determined boundaries of partitioning ranges.

* * * * *